United States Patent
Hatakeyama et al.

(10) Patent No.: US 12,451,747 B2
(45) Date of Patent: Oct. 21, 2025

(54) INSULATOR, ELECTRIC MOTOR, AND APPLIED EQUIPMENT

(71) Applicants: PANASONIC HOLDINGS CORPORATION, Kadoma (JP); PANASONIC APPLIANCES REFRIGERATION DEVICES SINGAPORE, Singapore (SG)

(72) Inventors: Tomoyuki Hatakeyama, Saitama (JP); Ikuo Ozaki, Shiga (JP); Satoshi Wada, Shiga (JP)

(73) Assignees: PANASONIC HOLDINGS CORPORATION, Osaka (JP); PANASONIC CORPORATION, Osaka (JP)

( * ) Notice: Subject to any disclaimer, the term of this patent is extended or adjusted under 35 U.S.C. 154(b) by 238 days.

(21) Appl. No.: 18/259,379

(22) PCT Filed: Dec. 15, 2021

(86) PCT No.: PCT/JP2021/046360
§ 371 (c)(1),
(2) Date: Jun. 26, 2023

(87) PCT Pub. No.: WO2022/145246
PCT Pub. Date: Jul. 7, 2022

(65) Prior Publication Data
US 2024/0063675 A1    Feb. 22, 2024

(30) Foreign Application Priority Data
Dec. 28, 2020  (JP) .................. 2020-219449

(51) Int. Cl.
*H02K 3/46* (2006.01)
*H02K 3/34* (2006.01)

(52) U.S. Cl.
CPC ................ *H02K 3/46* (2013.01); *H02K 3/34* (2013.01)

(58) Field of Classification Search
CPC .................................. H02K 3/34; H02K 3/46
(Continued)

(56) References Cited

U.S. PATENT DOCUMENTS

| 8,441,164 B2 | 5/2013 | Takahashi et al. |
| 2011/0298329 A1 | 12/2011 | Kinugawa et al. |

(Continued)

FOREIGN PATENT DOCUMENTS

| JP | 2011-254656 | 12/2011 |
| JP | 2012-125057 | 6/2012 |

(Continued)

OTHER PUBLICATIONS

International Search Report of PCT/JP2021/046360, Jan. 25, 2022, 2 pages.

(Continued)

*Primary Examiner* — Rashad H Johnson
(74) *Attorney, Agent, or Firm* — HSML P.C.

(57) ABSTRACT

An insulator (10) includes: an annular outer peripheral portion (11); and a wound portion (50) which extends in a first direction that is a direction from the outer peripheral portion (11) toward a center of the outer peripheral portion and around which a wire (42) is wound. The wound portion (50) includes: an introduction portion (52) to which the wire (42) is introduced from the outer peripheral portion (11); an extend-around portion (51) around which the wire (42) introduced from the introduction portion (52) extends; and an isolation wall (60) which is located between the introduction portion (52) and the extend-around portion (51) in the first direction and by which an introduced portion of the wire (42) which is introduced at the introduction portion (Continued)

(52) and a first-turn portion of the wire (42) which is wound around the extend-around portion (51) are isolated from each other.

8 Claims, 10 Drawing Sheets

(58) Field of Classification Search
USPC .......................................................... 310/208
See application file for complete search history.

(56) References Cited

U.S. PATENT DOCUMENTS

| | | | | |
|---|---|---|---|---|
| 2012/0286593 | A1* | 11/2012 | Yokogawa | H02K 3/522 |
| | | | | 310/43 |
| 2012/0293024 | A1* | 11/2012 | Yokogawa | H02K 3/522 |
| | | | | 310/43 |
| 2012/0313477 | A1* | 12/2012 | Haga | H02K 3/28 |
| | | | | 310/215 |
| 2017/0141634 | A1 | 5/2017 | Honda et al. | |
| 2018/0034336 | A1* | 2/2018 | Mori | H02K 1/148 |
| 2019/0356179 | A1 | 11/2019 | Kim et al. | |
| 2020/0259385 | A1 | 8/2020 | Hishida et al. | |
| 2024/0063675 | A1* | 2/2024 | Hatakeyama | H02K 3/34 |
| 2025/0055343 | A1* | 2/2025 | Murakami | H02K 3/522 |

FOREIGN PATENT DOCUMENTS

| | | |
|---|---|---|
| JP | 2020-28204 | 2/2020 |
| WO | 2019/058643 | 3/2019 |

OTHER PUBLICATIONS

The extended European search report issued for European Patent Application No. 21915107.3, Feb. 27, 2024, 8 pages.

* cited by examiner

INSULATOR, ELECTRIC MOTOR, AND APPLIED EQUIPMENT

TECHNICAL FIELD

The present disclosure relates to an insulator, an electric motor, and applied equipment.

BACKGROUND ART

An insulator of PTL 1 is known as a conventional insulator. The insulator includes: a coil wound portion around which a coil is wound; and a first flange portion located at one end of the coil wound portion and including a coil introducing groove.

CITATION LIST

Patent Literature

PTL 1: International Publication WO2019/058643

SUMMARY OF INVENTION

Technical Problem

In the insulator of PTL 1, the coil passes through the coil introducing groove and is wound around the coil wound portion. However, the degree of deformation of the coil differs depending on its material, its wire diameter, and the like. Therefore, there may be a case where when introducing the coil from the coil introducing groove to the coil wound portion, the coil largely curves and cannot be wound around a predetermined position. In this case, a first-turn portion of the coil which is would around the coil wound portion may overlap a winding start portion of the coil which is introduced from the coil introducing groove to the coil wound portion, and winding disorder of the coil may occur. With this, a space factor of the coil at the coil wound portion deteriorates, and therefore, the efficiency of an electric motor using the coil deteriorates.

An object of the present disclosure is to provide an insulator, an electric motor, and applied equipment which improve a space factor of a wire.

Solution to Problem

An insulator according to a first aspect of the present disclosure includes: an annular outer peripheral portion; and a wound portion which extends in a first direction that is a direction from the outer peripheral portion toward a center of the outer peripheral portion and around which a wire is wound. The wound portion includes: an introduction portion to which the wire is introduced from the outer peripheral portion; an extend-around portion around which the wire introduced from the introduction portion extends; and an isolation wall which is located between the introduction portion and the extend-around portion in the first direction and by which an introduced portion of the wire which is introduced at the introduction portion and a first-turn portion of the wire which is wound around the extend-around portion are isolated from each other.

According to this, the introduced portion of the wire which is introduced at the introduction portion and the first-turn portion of the wire which is wound around the extend-around portion are isolated from each other by the isolation wall. Therefore, the wire is wound around the extend-around portion while being aligned without being disarranged by the introduced portion of the wire. Thus, the space factor of the wire can be improved.

The insulator according to a second aspect of the present disclosure is configured such that in the first aspect, the introduction portion and the isolation wall are inclined relative to the first direction and a second direction which is orthogonal to the first direction and is a tangential direction of the outer peripheral portion. With this, cross winding of the wire can be easily realized by winding the wire along the isolation wall.

The insulator according to a third aspect of the present disclosure is configured such that in the first or second aspect, the isolation wall includes: an extending portion that extends from the extend-around portion in a third direction that is a direction along a center line of the outer peripheral portion; and an inclined portion that extends from an upper end of the extending portion and is inclined relative to the third direction toward an opposite side of the first direction. With this, a winding space in which the wire is wound around the extend-around portion can be made large, and therefore, the space factor of the wire can be improved.

The insulator according to a fourth aspect of the present disclosure is configured such that in any one of the first to third aspects, the extend-around portion includes a top surface and a groove located at at least an end of the top surface in a direction along the isolation wall. With this, the first-turn portion of the wire is wound around the extend-around portion along the isolation wall by the groove. Thus, a second-turn portion and subsequent portions of the wire can be wound around the extend-around portion while being aligned, and therefore, the space factor of the wire can be improved.

The insulator according to a fifth aspect of the present disclosure is configured such that: in any one of the first to fourth aspects, the outer peripheral portion includes an annular portion, an inner wall portion that is in connection with an inner peripheral end of the annular portion, and a guide portion that guides the wire to the introduction portion at the annular portion; the guide portion has a groove shape; the guide portion includes an opening that is open on the inner wall portion; and the opening of the guide portion is opposed to the isolation wall. With this, when introducing the wire from the guide portion through the introduction portion, the wire is prevented from largely curving at the extend-around portion by the isolation wall. Thus, the wire can be wound around the extend-around portion while being aligned, and therefore, the space factor of the wire can be improved.

The insulator according to a sixth aspect of the present disclosure is configured such that: in the fifth aspect, the outer peripheral portion includes an extending wall extending along the inner wall portion; and the isolation wall is located in front of the extending wall in the first direction.

An electric motor according to a seventh aspect of the present disclosure includes: the insulator according to any one of the first to sixth aspects; and the wire. With this, since the insulator in which an occupancy rate of the wire is high is used, driving efficiency of the electric motor can be improved.

Applied equipment according to an eighth aspect of the present disclosure includes the electric motor according to the seventh aspect. With this, since the insulator in which the occupancy rate of the wire is high is used, driving efficiency of the applied equipment can be improved.

Advantageous Effects of Invention

According to the respective aspects of the present disclosure, the space factor of the wire at the insulator can be improved.

DESCRIPTION OF EMBODIMENTS

Hereinafter, embodiments will be described with reference to the drawings.

Embodiment 1

Configuration of Electric Motor

Figure 1:
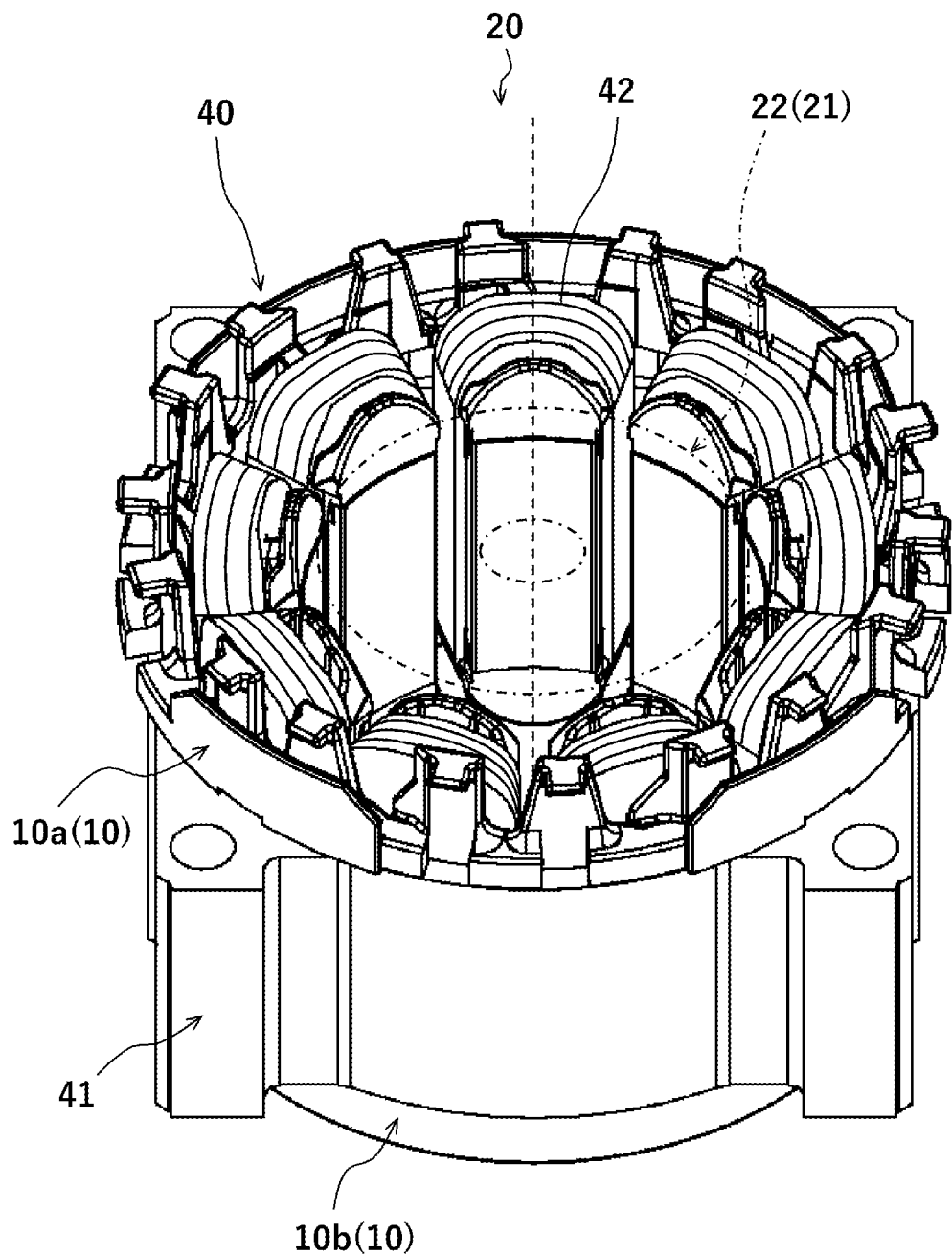
FIG. 1 is a perspective view of an electric motor including an insulator according to Embodiment 1.

For example, as shown in FIG. 1, an insulator 10 according to Embodiment 1 is included in an electric motor 20. The electric motor 20 includes a rotor 21 and a stator 40 surrounding a periphery of the rotor 21. The rotor 21 includes: a cylindrical rotor core 22; and a plurality of magnets located on an outer peripheral surface of the rotor core 22. The rotor core 22 is constituted by a plurality of electromagnetic steel sheets stacked on each other. The magnets are permanent magnets in each of which a surface thereof orthogonal to an axis of the rotor core 22 has a circular-arc shape.

Configuration of Stator

The stator 40 is cylindrical. The rotor 21 is fitted in a middle hole of the stator 40. The stator 40 is located coaxially with the rotor 21. An inner peripheral surface of the stator 40 is opposed to an outer peripheral surface of the rotor 21 with an interval therebetween. An axial direction that is a direction along a central axis of the stator 40 is referred to as an upper-lower direction. However, an arrangement direction of the stator 40 is not limited to this.

The stator 40 includes: a stator core 41; the insulator 10 attached to the stator core 41; and a wire 42 that is wound at the stator core 41 and the insulator 10. The stator core 41 and the wire 42 are made of an electrically conductive material. The insulator 10 is made of resin having an electric insulation property. The insulator 10 is located between the stator core 41 and the wire 42 so as to electrically insulate the stator core 41 and the wire 42 from each other.

Figure 2:
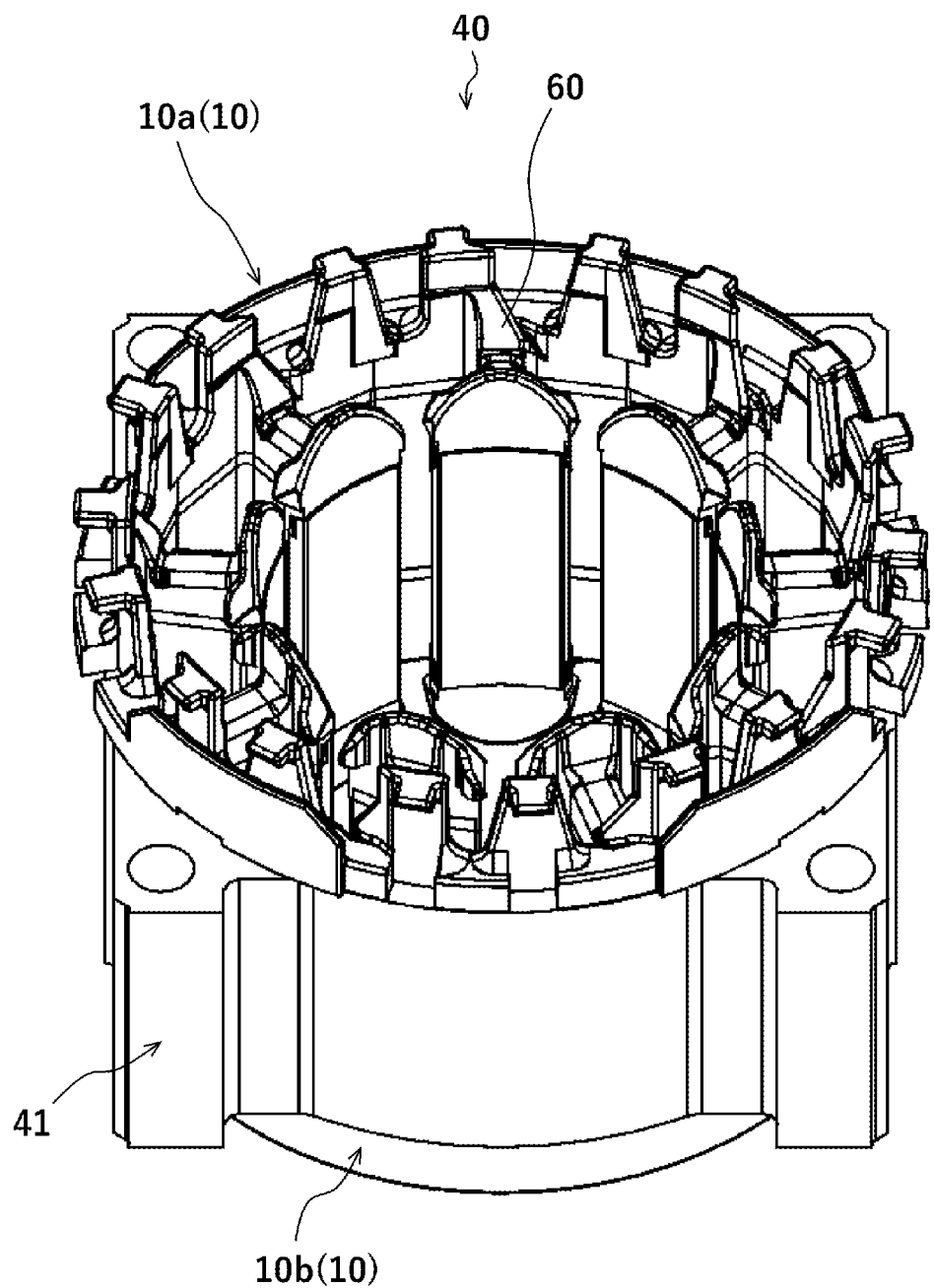
FIG. 2 is a perspective view of a stator of FIG. 1 before a wire is wound.
Figure 3:
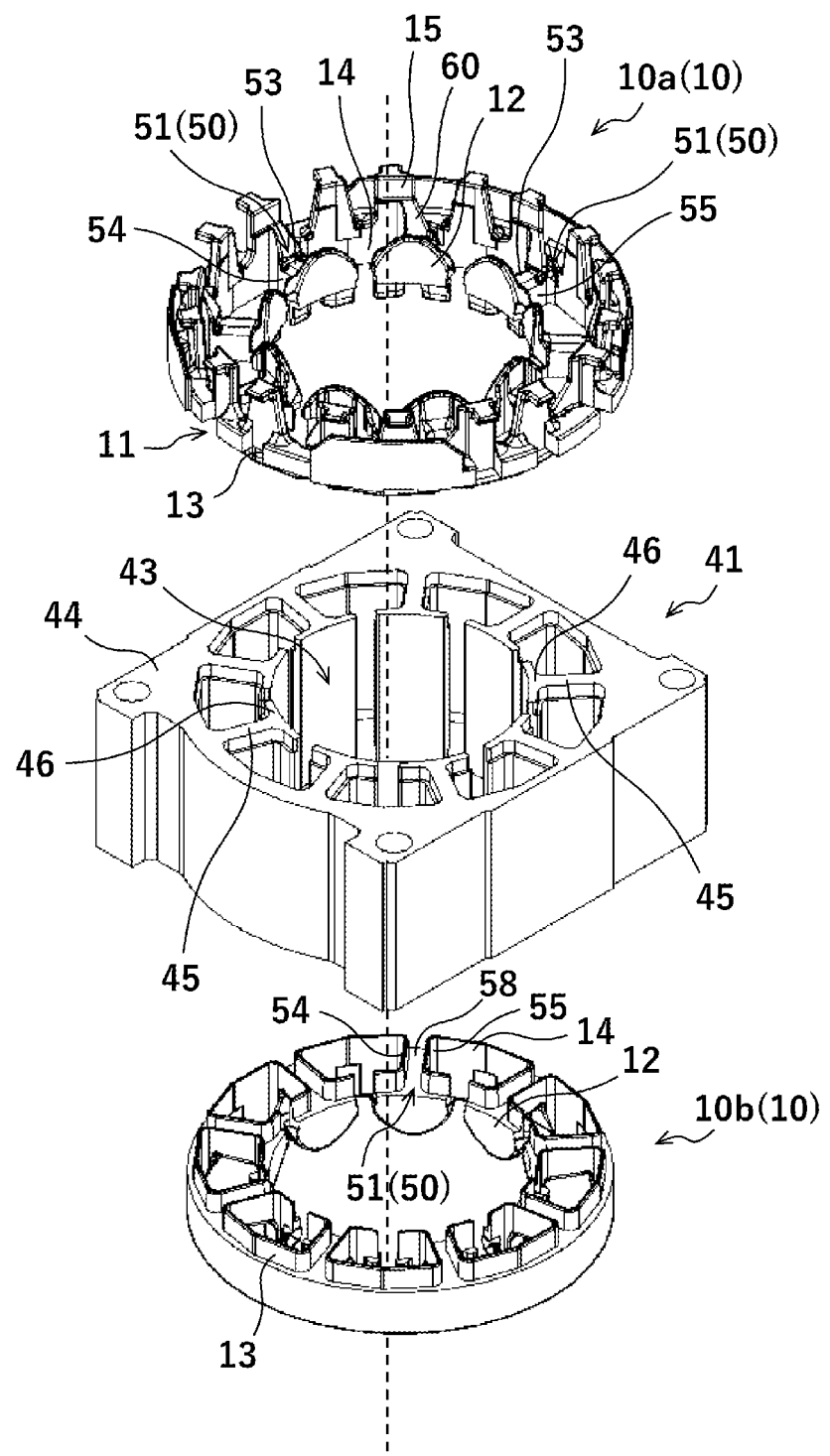
FIG. 3 is a perspective view showing a stator core and the insulator which are shown in FIG. 1.

As shown in FIGS. 2 and 3, the stator core 41 has a rectangular solid shape and includes a through hole 43, a back yoke portion 44, projecting portions 45, and flange portions 46. The back yoke portion 44, the projecting portions 45, and the flange portions 46 are integrally formed and are constituted by a plurality of electromagnetic steel sheets stacked on each other.

The through hole 43 penetrates a middle portion of the stator core 41 and extends between upper and lower surfaces of the stator core 41. A space formed by the through hole 43 has a columnar shape whose axis extends in the upper-lower direction. The back yoke portion 44 is a portion of the stator core 41 which is located at an opposite side (outside) of an axis side (inside) of the through hole 43 in a radial direction about an axis of the through hole 43. The back yoke portion 44 includes an inner peripheral surface surrounding a periphery of the through hole 43.

A plurality of (for example, nine) projecting portions 45 are provided. The projecting portions 45 are arranged at regular intervals in a circumferential direction about the axis of the through hole 43. The projecting portion 45 has, for example, a flat plate shape and projects inward in the radial direction from the inner peripheral surface of the back yoke portion 44. An outer end of the projecting portion 45 is in connection with the inner peripheral surface of the back yoke portion 44, and an inner end of the projecting portion 45 is in connection with the flange portion 46.

When viewed from above, an inner peripheral surface of the flange portion 46 has a circular-arc shape. The projecting portion 45 is in connection with a circumferential middle of the flange portion 46. Therefore, the flange portion 46 projects from the projecting portion 45 toward both sides in the circumferential direction. The flange portions 46 are arranged cylindrically such that a gap exists between the adjacent flange portions 46 in the circumferential direction.

The insulator 10 has a cylindrical shape whose central axis extends in the upper-lower direction. The insulator 10 may be constituted by a plurality of parts obtained by dividing the insulator 10 in the circumferential direction around the central axis and may have a cylindrical shape by connecting these parts in the circumferential direction. Moreover, the insulator 10 includes an upper insulator 10a and a lower insulator 10b. The upper insulator 10a covers an upper portion of the stator core 41, and the lower insulator 10b covers a lower portion of the stator core 41.

The upper insulator 10a includes: an annular outer peripheral portion 11; a plurality of (for example, nine) wound portions 50 projecting in a first direction (for example, inward) from the outer peripheral portion 11 toward a center 11a of the outer peripheral portion 11 along the radial direction; and a plurality of (for example, nine) inner peripheral portions 12 that are respectively in connection with inner ends of the wound portions 50. The wound portions 50 are arranged at regular intervals in the circumferential direction around the center 11a of the outer peripheral portion 11. A space between the adjacent wound portions 50 is a slot 47 into which the wire 42 is inserted. The wire 42 is wound around the wound portion 50 located between the adjacent slots 47.

The outer peripheral portion 11 is, for example, annular and includes an annular portion 13, inner wall portions 14, extending walls 15, and guide portions 16. The annular portion 13 is annular and orthogonal to the upper-lower direction. The annular portion 13 includes: an inner peripheral end located at an inside that is a center side of the annular portion 13; and an outer peripheral end located at an opposite side of the inside. As shown in FIG. 2, with the upper insulator 10*a* attached to the upper portion of the stator core 41, the annular portion 13 is placed on an upper surface of the stator core 41 so as to surround the periphery of the through hole 43. Details of the guide portion 16 will be described later.

Each inner wall portion 14 is located between the adjacent wound portions 50 in the circumferential direction and extends downward from the inner peripheral end of the annular portion 13. When viewed from above, the inner wall portion 14 has a circular-arc shape. As shown in FIG. 2, with the upper insulator 10*a* attached to the upper portion of the stator core 41, the inner wall portion 14 covers an inner peripheral surface of the stator core 41 at a gap between the adjacent projecting portions 45 in the circumferential direction.

A plurality of (for example, nine) extending walls 15 are located at the inner peripheral end of the annular portion 13. The extending wall 15 is located such that at least a part of the extending wall 15 overlaps the wound portion 50 when viewed in the radial direction from the inside. For example, a first circumferential side (for example, a right side) portion of the extending wall 15 overlaps a second circumferential side (for example, a left side) portion of the wound portion 50 when viewed from the inside. The extending wall 15 extends upward from the inner peripheral end of the annular portion 13. When viewed from the inside, the extending wall 15 has a trapezoidal shape. The extending wall 15 has a flat plate shape having a radial thickness that is smaller than that of the annular portion 13.

A lower end of the extending wall 15 is in connection with the annular portion 13. A bent portion 15*a* that extends outward in the radial direction is located at an upper end of the extending wall 15. An insertion portion 15*b* into which the wire 42 is inserted is formed in a space surrounded by the bent portion 15*a* and the extending wall 15. The insertion portion 15*b* is located outside the extending wall 15 and under the bent portion 15*a*. The wire 42 is locked by the bent portion 15*a* and the extending wall 15 and inserted to the wound portion 50 through the guide portion 16.

An outer end of the wound portion 50 is in connection with the inner wall portion 14. An inner end of the wound portion 50 is in connection with the inner peripheral portion 12. The wound portion 50 includes an extend-around portion 51, an introduction portion 52, and an isolation wall 60. The extend-around portion 51 is a portion which is located at an opposite side of the introduction portion 52 across the isolation wall 60 in the radial direction and projects inward from the isolation wall 60 and around which the wire 42 introduced from the introduction portion 52 is wound and extends. Details of the introduction portion 52 and the isolation wall 60 will be described later.

Figure 8:
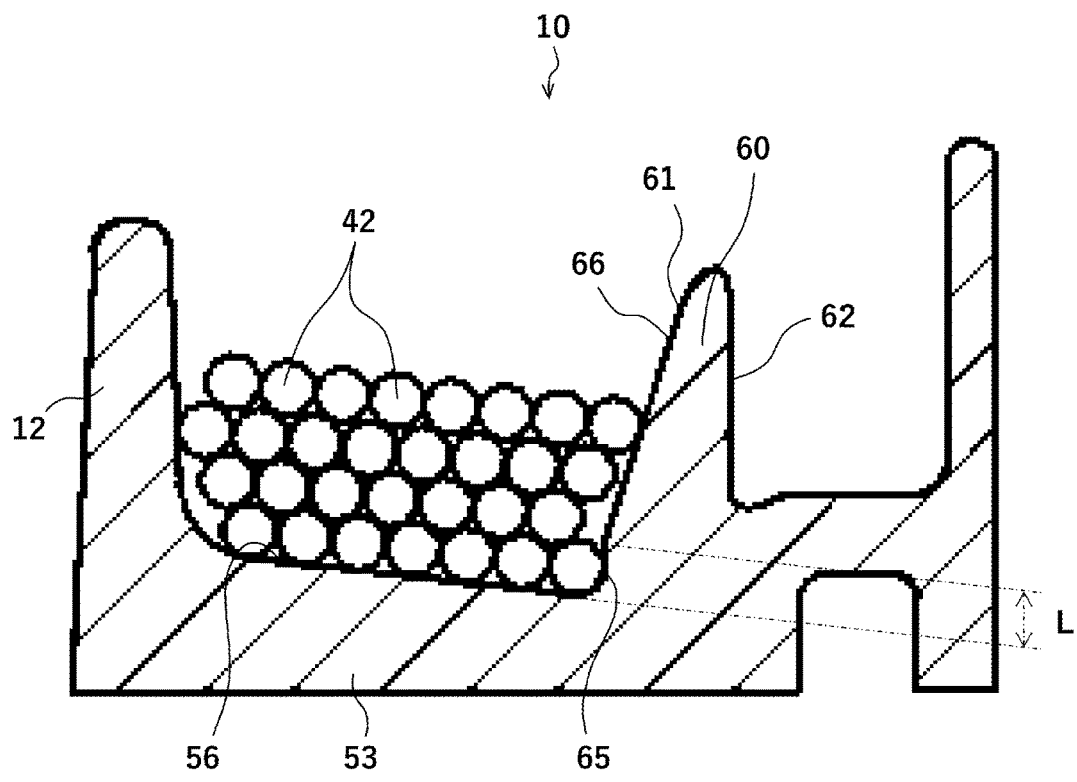
FIG. 8 is a sectional view of a part of the insulator of FIG. 7.

A section of the extend-around portion 51 which is orthogonal to the radial direction has an inverted U shape that is depressed upward. The extend-around portion 51 includes: an upper wall 53; a left side wall 54 located at a left side of the upper wall 53; and a right side wall 55 located at a right side of the upper wall 53. The upper wall 53 has, for example, a rectangular flat plate shape. A length of the upper wall 53 in the circumferential direction is shorter than a length of the upper wall 53 in the radial direction. As shown in FIG. 8, a top surface 56 that is an upper surface of the upper wall 53 is inclined relative to a plane orthogonal to the upper-lower direction so as to extend downward as the top surface 56 extends outward.

Figure 5:
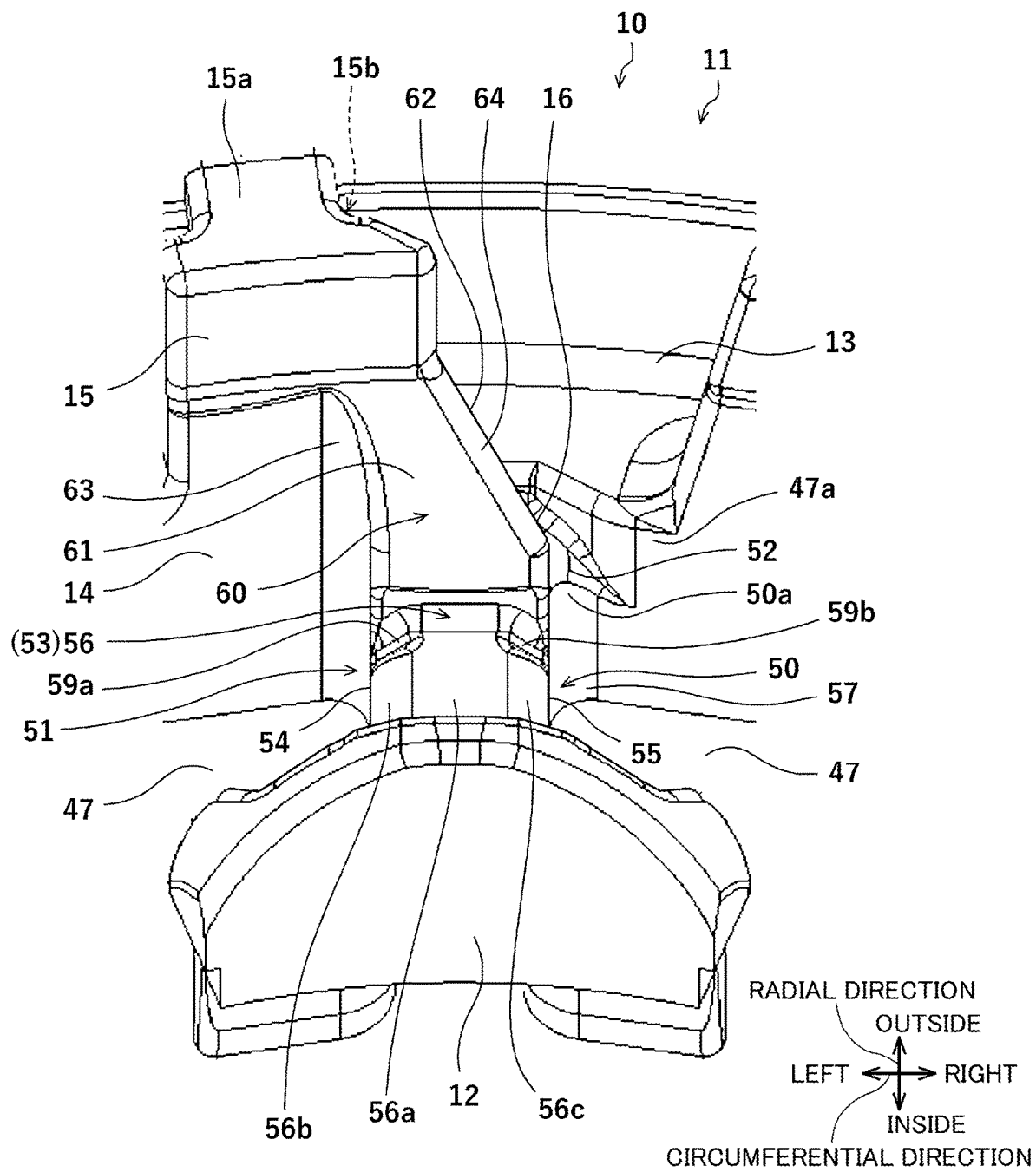
FIG. 5 is a perspective view showing a part of the insulator of FIG. 4.
Figure 6:
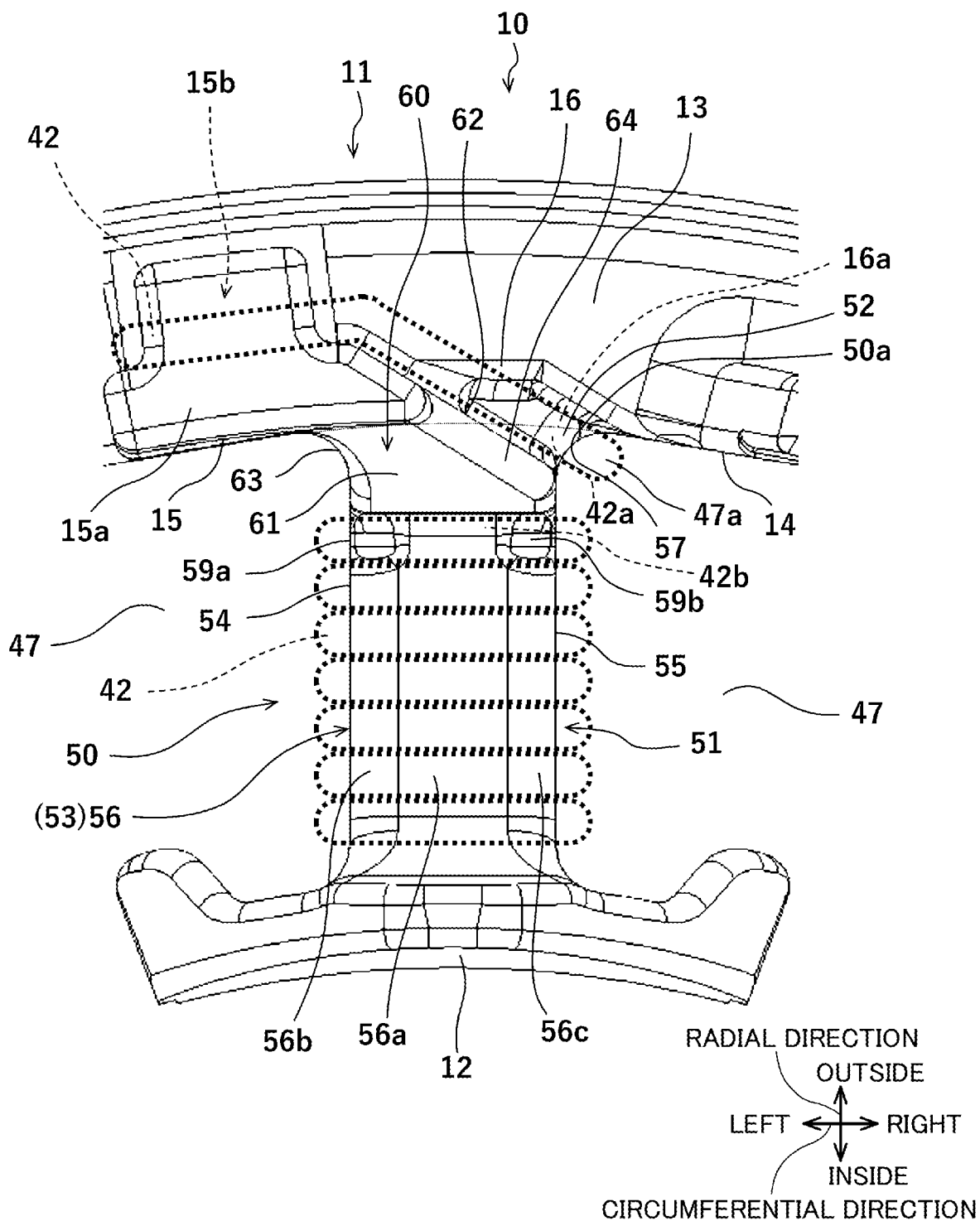
FIG. 6 is a diagram showing a part of the insulator of FIG. 4 when viewed from above.

As shown in FIGS. 5 and 6, the top surface 56 includes: a middle portion 56*a* in the circumferential direction; a left portion 56*b* located at a left side of the middle portion 56*a* in the circumferential direction; and a right portion 56*c* located at a right side of the middle portion 56*a* in the circumferential direction. The middle portion 56*a* is flat. The left portion 56*b* is inclined downward as it extends leftward. The right portion 56*c* is inclined downward as it extends rightward. The middle portion 56*a* is a portion including a circumferential middle position of the top surface 56. The left portion 56*b* is a portion including a left end of the top surface 56. The right portion 56*c* is a portion including a right end of the top surface 56.

An upper end of the left side wall 54 is in connection with a left end of the upper wall 53. An upper end of the right side wall 55 is in connection with a right end of the upper wall 53. The left side wall 54 and the right side wall 55 extend downward from the upper wall 53. As shown in FIG. 2, with the upper insulator 10*a* attached to the upper portion of the stator core 41, the upper wall 53 covers an upper surface of the projecting portion 45, the left side wall 54 covers a left surface of the projecting portion 45, and the right side wall 55 covers a right surface of the projecting portion 45.

The inner peripheral portion 12 has, for example, a semicircular shape projecting upward when viewed from the inside. The inner peripheral portion 12 intersects with (for example, is orthogonal to) the upper wall 53 and extends upward from the upper wall 53. When viewed from above, an inner peripheral surface of the inner peripheral portion 12 has a circular-arc shape. The inner peripheral portion 12 is longer than the upper wall 53 in the circumferential direction. A middle of the inner peripheral portion 12 is in connection with the upper wall 53. The inner peripheral portion 12 projects rightward beyond the right end of the upper wall 53 and projects leftward beyond the left end of the upper wall 53. Right and left ends of the inner peripheral portion 12 project outward in the radial direction.

As shown in FIG. 2, with the upper insulator 10*a* attached to the upper portion of the stator core 41, the inner peripheral portion 12 is located on the flange portion 46 of the stator core 41. Herein, the inner peripheral surface of the inner peripheral portion 12 and the inner peripheral surface of the flange portion 46 are flush with each other to constitute the inner peripheral surface of the stator 40.

As shown in FIG. 3, the lower insulator 10*b* includes the outer peripheral portion 11, the wound portions 50, and the inner peripheral portions 12. The outer peripheral portion 11 includes the annular portion 13 and the inner wall portions 14. Each wound portion 50 includes the upper wall 53, the left side wall 54, and the right side wall 55. The inner peripheral portion 12, the annular portion 13, the inner wall portion 14, a lower wall 58, the left side wall 54, and the right side wall 55 in the lower insulator 10*b* are respectively the same as the inner peripheral portion 12, the annular portion 13, the inner wall portion 14, the upper wall 53, the left side wall 54, and the right side wall 55 in the upper insulator 10*a*.

Guide Portion, Introduction Portion, and Isolation Wall

As shown in FIGS. 4 to 8, the guide portion 16 extends rightward in the circumferential direction from the insertion portion 15*b* at the annular portion 13. The guide portion 16 linearly extends inward toward the wound portion 50 as it extends rightward. At least a part of the guide portion 16 in its extending direction may have a groove shape. For example, a portion of the guide portion 16 which extends rightward beyond a right end of the extending wall 15 has a groove shape. The groove shape of the guide portion 16 becomes deeper as the guide portion extends rightward.

A right end of the guide portion 16 is open with respect to the inner wall portion 14, i.e., the guide portion 16 includes a right opening 16*a*. With this, the wire 42 having passed through the insertion portion 15*b* is guided by the guide portion 16 and extends to the wound portion 50 through the right opening 16*a*.

A left end of the introduction portion 52 is in connection with the right opening 16*a* of the guide portion 16. A right end of the introduction portion 52 is located at a right corner portion 50*a* that is a right end of an outer end of the wound portion 50 that is in connection with the inner wall portion 14. The introduction portion 52 linearly extends from the insertion portion 15*b* toward the right corner portion 50*a* together with the guide portion 16. The right corner portion 50*a* is adjacent in the circumferential direction to a left corner portion 47*a* of the slot 47 which is located between the inner wall portion 14 and the right end of the wound portion 50. With this, as the wire 42 extends rightward from the insertion portion 15*b* through the guide portion 16 and the introduction portion 52, the wire 42 linearly extends inward and is guided downward, and then, extends from the right corner portion 50*a* to the left corner portion 47*a*.

Herein, the introduction portion 52 has a groove shape. The groove shape of the introduction portion 52 becomes deeper as the introduction portion 52 extends rightward. With this, the bottom of the introduction portion 52 is inclined downward as it extends rightward. The right end of the introduction portion 52 is in connection with an upper end of a right side surface 57 of the wound portion 50. The right side surface 57 is formed by a curved surface which: extends inward from the inner wall portion 14; curves leftward as the right side surface 57 extends inward; and is recessed in the circumferential direction.

An angle between the bottom of the introduction portion 52 and the right side surface 57 is larger than 90 degrees, and there is no sharp ridge at the right corner portion 50*a*. Therefore, the wire 42 is guided along the bottom of the introduction portion 52 onto the right side surface 57 at the lower side and can smoothly move at the right corner portion 50*a* located between the introduction portion 52 and the right side surface 57. Moreover, curving of the wire 42 is reduced when the wire 42 extends from the introduction portion 52 to the right side surface 57. The wire 42 is wound around the wound portion 50 while being aligned.

The isolation wall 60 projects inward from the inner wall portion 14 at the inside of the extending wall 15 and is located at the wound portion 50. The isolation wall 60 includes: an inner wall surface 61; an outer wall surface 62 located at an opposite side of the inner wall surface 61 in the radial direction; a left wall surface 63 that is in connection with a left end of the inner wall surface 61; and a right wall surface 64 located at an opposite side of the left wall surface 63 in the circumferential direction. The left wall surface 63 is formed by a curved surface which: extends inward from the inner wall portion 14; curves rightward as the left wall surface 63 extends inward; and is recessed rightward.

The isolation wall 60 is located such that at least a part thereof overlaps the extending wall 15 when viewed from the inside in the radial direction. For example, a first circumferential side (for example, a left side) portion of the isolation wall 60 overlaps a second circumferential side (for example, a right side) portion of the extending wall 15 when viewed from the inside.

Therefore, a left portion of the isolation wall 60 is in connection with a right portion of the extending wall 15, and a right portion of the isolation wall 60 extends rightward beyond the extending wall 15. The right wall surface 64 is located at an upper surface of the right portion of the isolation wall 60, and the outer wall surface 62 is located at an outer surface of the isolation wall 60. The right wall surface 64 is inclined downward as it extends rightward from the right end of the extending wall 15. When viewed from above, a left end of the right wall surface 64 is adjacent to the introduction portion 52 in the circumferential direction, and a right end of the right wall surface 64 is located at the inside of the introduction portion 52 in the radial direction.

The outer wall surface 62 is opposed to the right opening 16*a* of the guide portion 16. The outer wall surface 62 extends inward along the introduction portion 52 at the inside of the introduction portion 52 as it extends rightward. With this, the wire 42 is introduced from the right opening 16*a* of the guide portion 16 to the introduction portion 52 and is guided inward along the outer wall surface 62. At this time, the wire 42 having been introduced to the introduction portion 52 is prevented from largely curving inward by the isolation wall 60 located at the inside of the introduction portion 52. Therefore, an introduced portion 42*a* of the wire 42 is prevented from interfering with a portion of the wire 42 which is wound around the extend-around portion 51 located at the inside of the isolation wall 60. On this account, the wire 42 can be wound around the extend-around portion 51 while being aligned. Thus, a space factor of the wire 42 at the insulator 10 can be increased, and therefore, the efficiency of the electric motor 20 using the insulator 10 can be improved.

The inner wall surface 61 is located over the entire length of the wound portion 50 in the circumferential direction. A left end of the inner wall surface 61 in the circumferential direction is in connection with the left wall surface 63, and a right end of the inner wall surface 61 in the circumferential direction is in connection with the right wall surface 64. An upper end of the inner wall surface 61 in the upper-lower direction is in connection with the extending wall 15, and a lower end of the inner wall surface 61 in the upper-lower direction is in connection with the top surface 56 of the extend-around portion 51. With this, a first-turn portion 42*b* of the wire 42 that is wound around the extend-around portion 51 clockwise when viewed from the inside extends rightward in the circumferential direction along the inner wall surface 61 on the top surface 56. Then, an n-th-turn portion (n is an integer of two or more) of the wire 42 extends in the circumferential direction along an (n−1)-th-turn portion of the wire 42 at the inside of the (n−1)-th-turn portion of the wire 42 on the top surface 56.

As above, in the wire 42, the introduced portion 42*a* introduced by the introduction portion 52 located outside the isolation wall 60 and the first-turn portion 42*b* wound around the extend-around portion 51 located inside the isolation wall 60 are isolated from each other by the isolation wall 60. Therefore, the wire 42 is wound around the extend-around portion 51 while being aligned. Thus, the space factor of the wire 42 at the insulator 10 can be increased, and therefore, the efficiency of the electric motor 20 using the insulator 10 can be improved.

Figure 7:
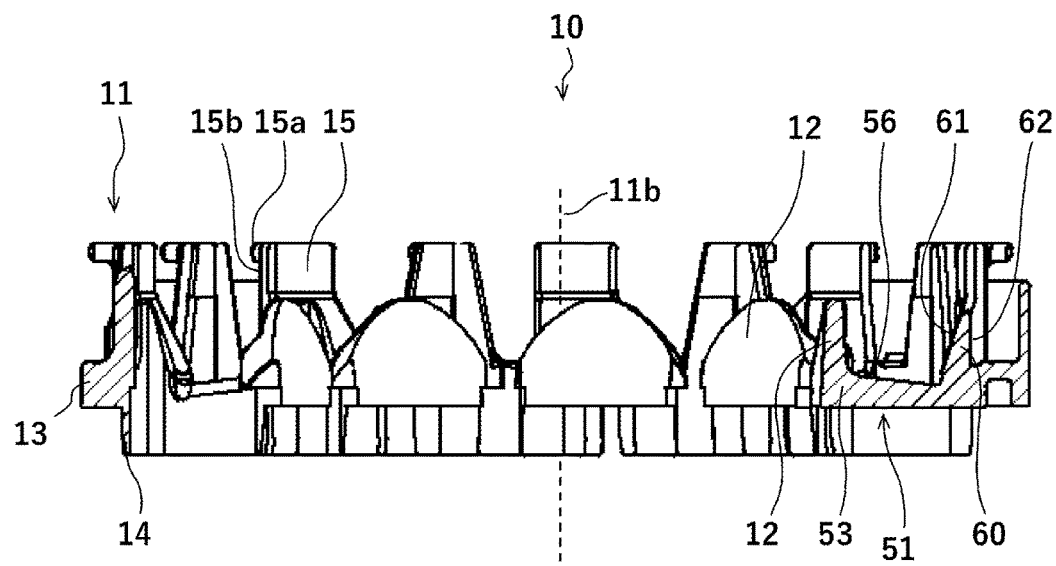
FIG. 7 is a sectional view of the insulator of FIG. 4.

As shown in FIGS. 7 and 8, the inner wall surface 61 includes an extending portion 65 that extends in a third direction (for example, the upper direction) from the top surface 56 of the extend-around portion 51. The third direction is a direction extending from the extend-around portion 51 along a center line 11b of the outer peripheral portion 11. The extending portion 65 is, for example, flat and extends in the upper-lower direction and a direction orthogonal to the radial direction. A length L of the extending portion 65 in the upper-lower direction is equal to or shorter than the diameter of the wire 42. Therefore, the first-turn portion of the wire 42 can be wound on the top surface 56 along the inner wall surface 61. Therefore, portions of the wire 42 at a first stage which are lined up on the top surface 56 can be wound while being aligned in order from the outside toward the inside. Moreover, each of portions of the wire 42 at an (m+1)-th stage (m is an integer of one or more) which are lined up on portions of the wire 42 at an m-th stage can be located on between the portions of the wire 42 which are adjacent to each other in the radial direction at the m-th stage. Thus, the space factor of the wire 42 at the insulator 10 can be increased, and therefore, the efficiency of the electric motor 20 using the insulator 10 can be improved.

Furthermore, an inclined portion 66 of the inner wall surface 61 which is located at an upper side of the extending portion 65 is, for example, flat and extends upward from an upper end of the extending portion 65. The inclined portion 66 is inclined relative to the upper-lower direction so as to extend outward as it extends upward. An angle between the inclined portion 66 and the top surface 56 is larger than 90°. Moreover, a surface of the inner peripheral portion 12 which is opposed to the inner wall surface 61 extends along the upper-lower direction. Therefore, a winding space which is located between the inner wall portion 14 and the inclined portion 66 and in which the wire 42 is wound around the extend-around portion 51 increases as it extends upward. With this, the space factor of the wire 42 at the insulator 10 can be increased, and therefore, the efficiency of the electric motor 20 using the insulator 10 can be improved. Moreover, an upper opening of the winding space can be made large. Therefore, the wire 42 can be easily inserted into the winding space through the upper opening and can be easily wound around the extend-around portion 51.

Modified Example 1

Figure 4:
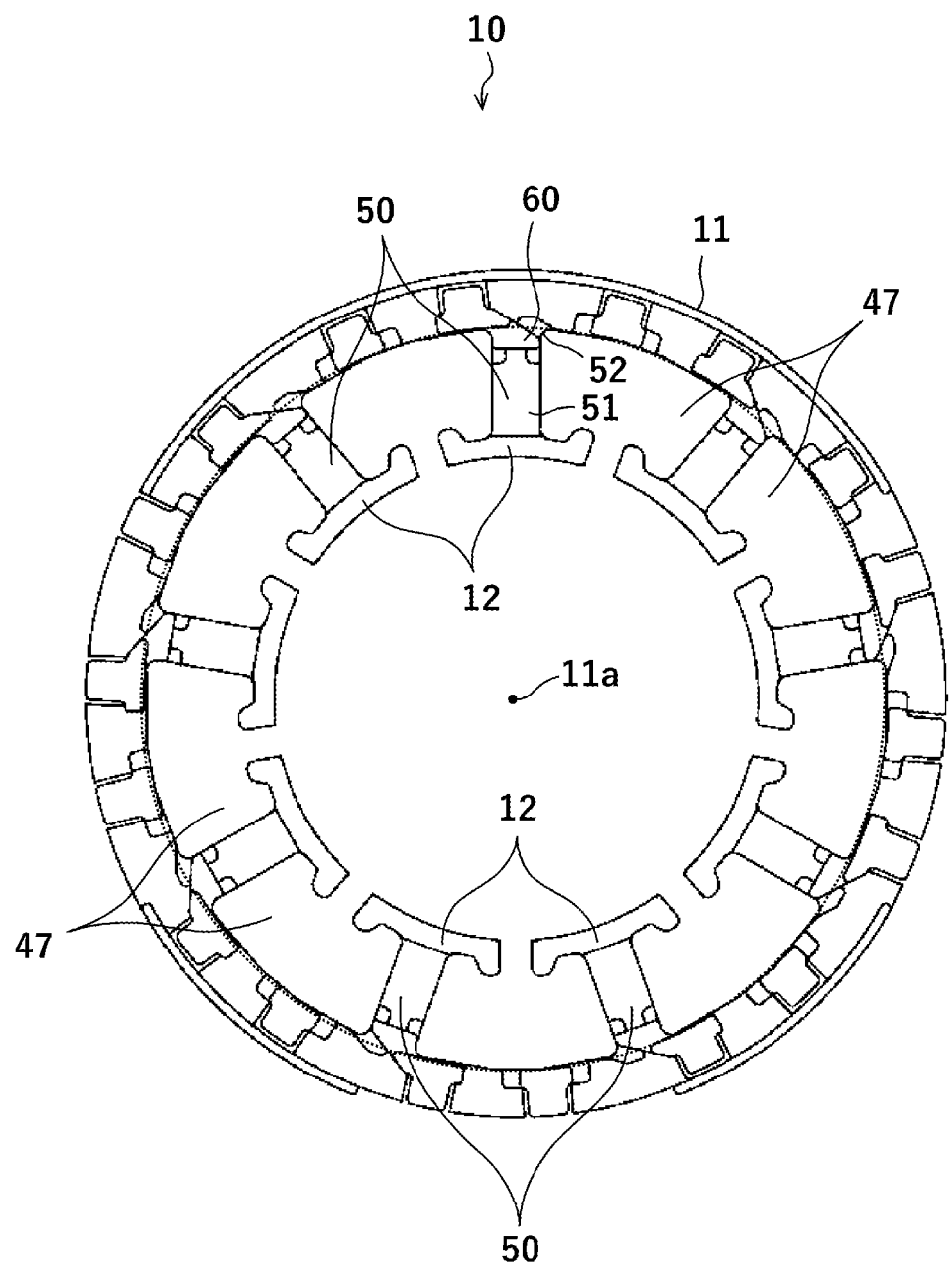
FIG. 4 is a diagram showing the insulator of FIG. 1 when viewed from above.

The insulator 10 according to Modified Example 1 is configured such that in Embodiment 1, as shown in FIGS. 4 to 6, the extend-around portion 51 includes the top surface 56 and a groove which extends on the top surface 56 along the isolation wall 60 and becomes deeper as it extends toward an end of the top surface 56. This groove includes: a left groove 59a located at the left portion 56b of the top surface 56; and a right groove 59b located at the right portion 56c of the top surface 56.

The left groove 59a and the right groove 59b extend on the top surface 56 along the inner wall surface 61 of the isolation wall 60. With this, the first-turn portion of the wire 42 which is wound on the top surface 56 is fitted in the left groove 59a and the right groove 59b and wound around the extend-around portion 51 along the inner wall surface 61 of the isolation wall 60. Thus, the portions of the wire 42 at the first stage which are wound on the top surface 56 can be aligned along the first-turn portion. Thus, the space factor of the wire 42 at the insulator 10 can be increased, and therefore, the efficiency of the electric motor 20 using the insulator 10 can be improved.

Moreover, the left groove 59a becomes deeper as it extends toward the left side of the left portion 56b, and the right groove 59b becomes deeper as it extends toward the right side of the right portion 56c. Therefore, each of an angle between the bottom of the left groove 59a and the left side wall 54 and an angle between the bottom of the right groove 59b and the right side wall 55 becomes an obtuse angle that is larger than 90°. With this, when guiding the wire 42 from the right groove 59b to the right side wall 55 and when guiding the wire 42 from the left wall surface 63 to the left groove 59a, the wire 42 is prevented from being largely bent. Therefore, the wire 42 can be wound around the extend-around portion 51 while being aligned.

Modified Example 2

Figure 9A:
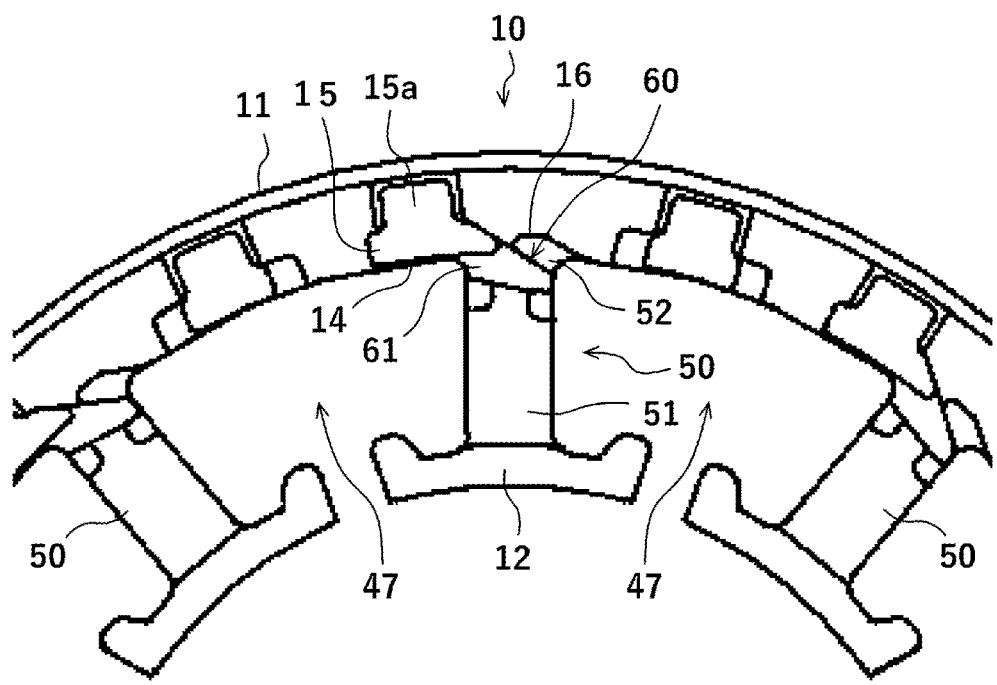
FIG. 9A is a diagram showing a part of the insulator according to Modified Example 1 when viewed from above.

The insulator 10 according to Modified Example 2 is configured such that in Embodiment 1 or Modified Example 1, the introduction portion 52 and the isolation wall 60 are inclined relative to the first direction and a second direction which is orthogonal to the first direction and is a tangential direction of the outer peripheral portion 11. For example, as shown in FIG. 9A, the introduction portion 52 and the isolation wall 60 are inclined relative to the radial direction and a direction orthogonal to the radial direction so as to extend inward in the radial direction as they extend rightward in the circumferential direction.

Figure 9B:
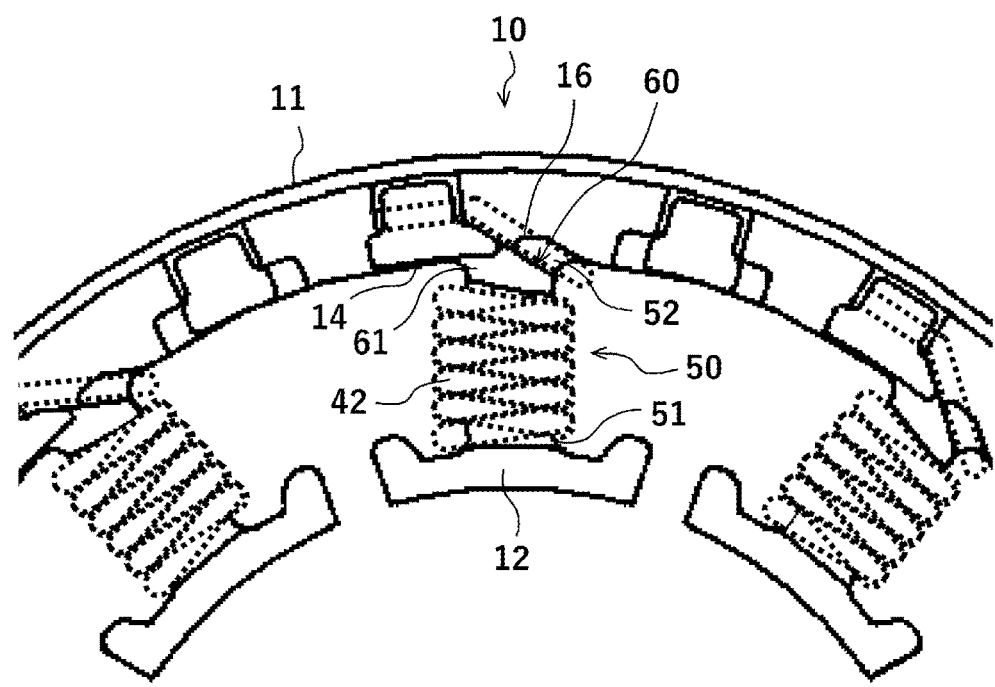
FIG. 9B is a diagram showing that a wire is wound around a wound portion of the insulator of FIG. 9A.

In this case, as shown in FIG. 9B, the wire 42 is introduced to the extend-around portion 51 while being inclined inward as it extends rightward at the introduction portion 52. Then, at the extend-around portion 51, the portions of the wire 42 at the first stage are wound on the top surface 56 while being inclined inward as they extend rightward along the inner wall surface 61. The portions of the wire 42 at the second stage are wound on the portions of the wire 42 at the first stage while being inclined outward as they extend rightward. As above, since the introduction portion 52 and the isolation wall 60 are inclined, the winding of the wire 42 at the extend-around portion 51 is not inhibited by the portion of the wire 42 which is introduced to the introduction portion 52, and cross winding of the wire 42 at the extend-around portion 51 can be easily realized.

Modified Example 3

Figure 10A:
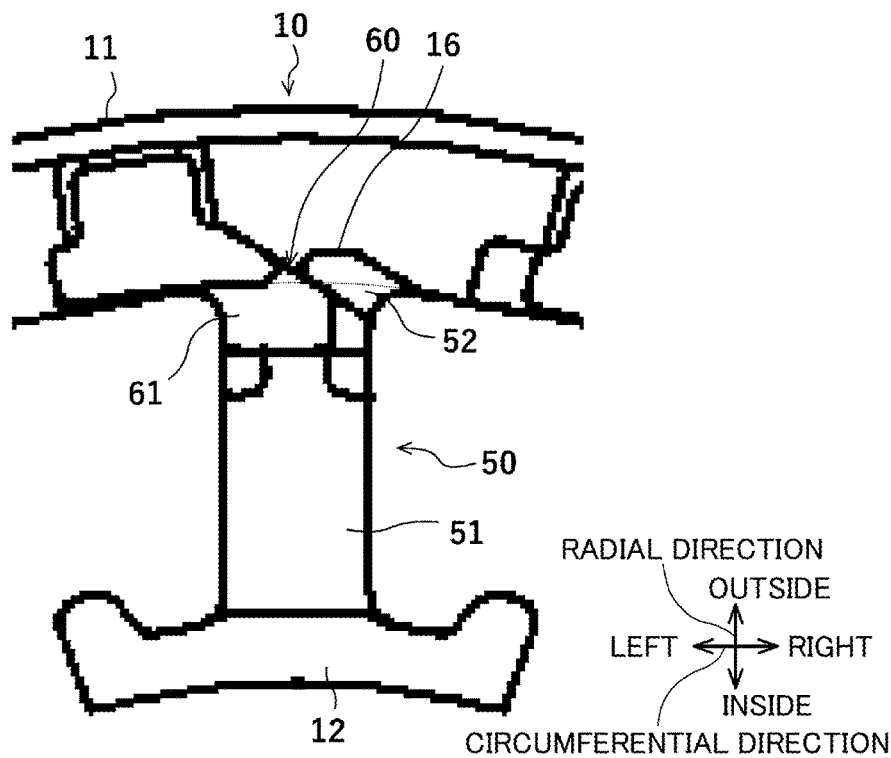
FIG. 10A is a diagram showing a part of the insulator according to Modified Example 2 when viewed from above.

The insulator 10 according to Modified Example 3 is configured such that in Embodiment 1, Modified Example 1, or Modified Example 2, as shown in FIG. 10A, the isolation wall 60 does not have to be located over the entire length of the wound portion 50 in the circumferential direction as long as at least a part of the isolation wall 60 is located at the inside of the introduction portion 52 in the radial direction.

Figure 10B:
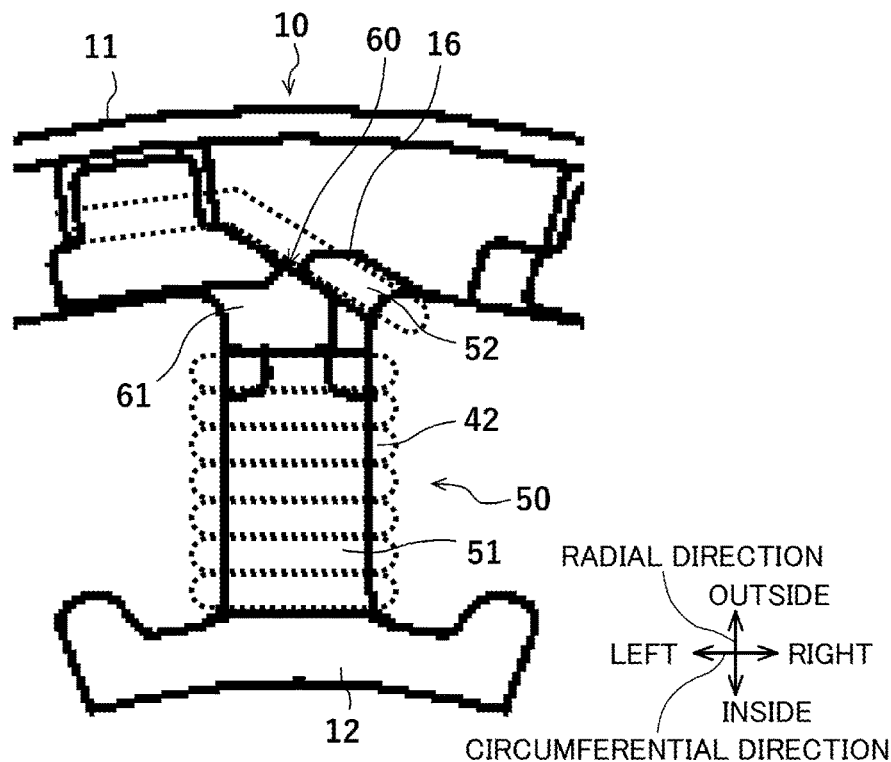
FIG. 10B is a diagram showing that the wire is wound around the wound portion of the insulator of FIG. 10A.

For example, in FIG. 10A, a right end of the isolation wall 60 is located at the left side of the right end of the wound portion 50. Therefore, a gap exists between the right end of the isolation wall 60 and the right end of the wound portion 50. On the other hand, the right end of the isolation wall 60 is located at the right side of the left end of the introduction portion 52, and the isolation wall 60 is located between the left portion of the introduction portion 52 and the extend-around portion 51 in the radial direction. Therefore, as shown in FIG. 10B, in the wire 42, the introduced portion 42a introduced by the introduction portion 52 and the portion 42b wound around the extend-around portion 51 are isolated from each other by the isolation wall 60. With this, since the wire 42 can be wound around the extend-around portion 51 while being aligned, the space factor of the wire 42 at the insulator 10 can be increased, and therefore, the efficiency of the electric motor 20 using the insulator 10 can be improved.

Embodiment 2

As shown in FIG. 1, the electric motor 20 according to Embodiment 2 includes the stator 40 and the rotor 21 that rotates relative to the stator 40. The rotor 21 includes the stator core 41, the wire 42, and the insulator 10 that electrically insulates the stator core 41 and the wire 42 from each other. One example of the electric motor 20 is a motor.

Figure 11:
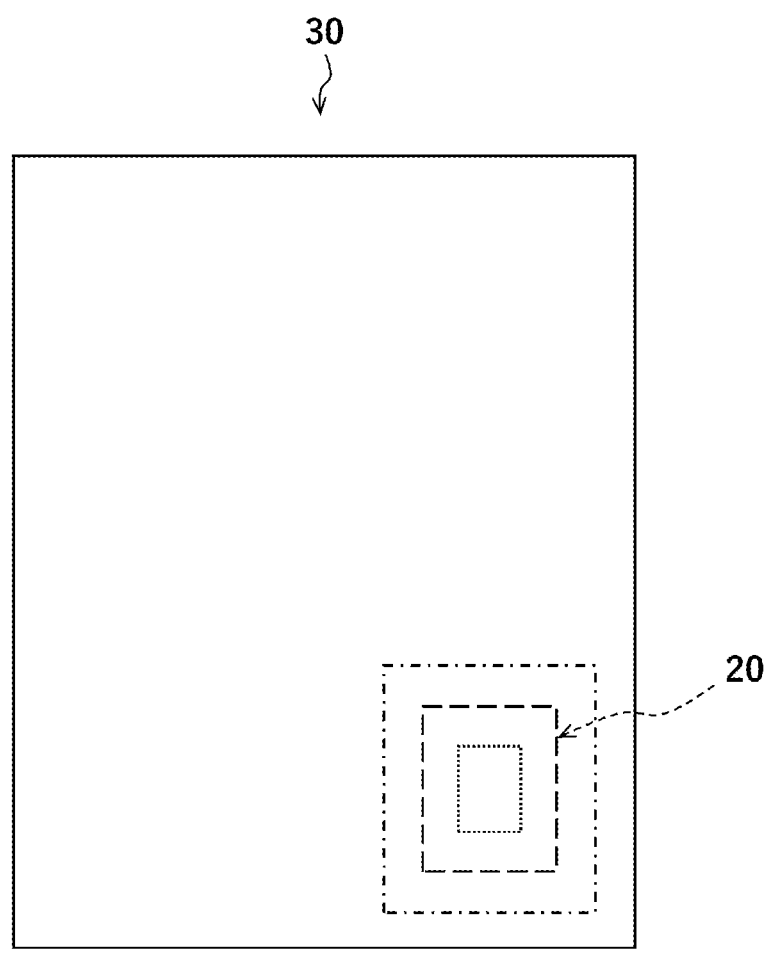
FIG. 11 is a diagram showing an electric motor according to Embodiment 2 and applied equipment including the electric motor.

As shown in FIG. 11, applied equipment 30 includes the electric motor 20 and is driven by the electric motor 20. One example of the applied equipment 30 is a refrigerant compressor. For example, the refrigerant compressor is included in a freezer or an air conditioner. More specifically, examples of equipment including the refrigerant compressor include a refrigerator, a freezer, an air conditioner, a showcase, and a vending machine. Moreover, in addition to the refrigerant compressor, examples of the applied equipment 30 include various types of equipment, such as a blower, a pump, and a traveling driving source of a moving machine.

The insulator 10 according to any one of Embodiments 1 and 2 and Modified Examples 1 to 3 is used in the electric motor 20 or the applied equipment 30. The driving efficiency of the electric motor 20 and the applied equipment 30 can be improved by the insulator 10 in which the space factor of the wire 42 is improved.

From the foregoing explanation, many modifications and other embodiments of the present disclosure are obvious to one skilled in the art. Therefore, the foregoing explanation should be interpreted only as an example and is provided for the purpose of teaching the best mode for carrying out the present disclosure to one skilled in the art. The structures and/or functional details may be substantially modified within the scope of the present disclosure.

INDUSTRIAL APPLICABILITY

The insulator, the electric motor, and the applied equipment according to the present disclosure are useful as the insulator, the electric motor, and the applied equipment in each of which the space factor of the wire has been improved.

REFERENCE SIGNS LIST 10 insulator
11 outer peripheral portion
13 annular portion
14 inner wall portion
16 guide portion
20 electric motor
30 applied equipment
42 wire
50 wound portion
51 extend-around portion
52 introduction portion
56 top surface
60 isolation wall
65 extending portion
66 inclined portion

The invention claimed is:

1. An insulator comprising:
an annular outer peripheral portion; and
a wound portion which extends in a first direction that is a direction from the outer peripheral portion toward a center of the outer peripheral portion and around which a wire is wound, wherein
the wound portion includes
an introduction portion to which the wire is introduced from the outer peripheral portion,
an extend-around portion around which the wire introduced from the introduction portion extends, and
an isolation wall which is located between the introduction portion and the extend-around portion in the first direction and by which an introduced portion of the wire which is introduced at the introduction portion and a first-turn portion of the wire which is wound around the extend-around portion are isolated from each other.

2. The insulator according to claim 1, wherein the introduction portion and the isolation wall are inclined relative to the first direction and a second direction which is orthogonal to the first direction and is a tangential direction of the outer peripheral portion.

3. The insulator according to claim 1, wherein the isolation wall includes
an extending portion that extends from the extend-around portion in a third direction that is a direction along a center line of the outer peripheral portion and
an inclined portion that extends from an upper end of the extending portion and is inclined relative to the third direction toward an opposite side of the first direction.

4. The insulator according to claim 1, wherein the extend-around portion includes
a top surface and
a groove located at at least an end of the top surface in a direction along the isolation wall.

5. The insulator according to claim 1, wherein:
the outer peripheral portion includes
an annular portion,
an inner wall portion that is in connection with an inner peripheral end of the annular portion, and
a guide portion that guides the wire to the introduction portion at the annular portion;
the guide portion has a groove shape;
the guide portion includes an opening that is open on the inner wall portion; and
the opening of the guide portion is opposed to the isolation wall.

6. The insulator according to claim 5, wherein:
the outer peripheral portion includes an extending wall extending along the inner wall portion; and
the isolation wall is located in front of the extending wall in the first direction.

7. An electric motor comprising:
the insulator according to claim 1; and
the wire.

8. Applied equipment comprising the electric motor according to claim 7.

* * * * *